United States Patent
AlTammar et al.

(10) Patent No.: US 11,649,398 B1
(45) Date of Patent: May 16, 2023

(54) COMPOSITION AND METHOD OF USING DATE PALM FIBERS IN HYDRAULIC FRACTURING

(71) Applicant: SAUDI ARABIAN OIL COMPANY, Dhahran (SA)

(72) Inventors: Murtadha J. AlTammar, Dhahran (SA); Md Amanullah, Dhahran (SA); Khalid Mohammed Alruwaili, Dammam (SA); Mohammed A. Bataweel, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/643,430

(22) Filed: Dec. 9, 2021

(51) Int. Cl.
| C09K 8/68 | (2006.01) |
| C09K 8/66 | (2006.01) |
| C09K 8/80 | (2006.01) |
| E21B 43/27 | (2006.01) |
| E21B 43/267 | (2006.01) |
| C09K 8/72 | (2006.01) |

(52) U.S. Cl.
CPC ............ C09K 8/68 (2013.01); C09K 8/665 (2013.01); C09K 8/725 (2013.01); C09K 8/80 (2013.01); E21B 43/267 (2013.01); E21B 43/27 (2020.05); C09K 2208/08 (2013.01); C09K 2208/10 (2013.01)

(58) Field of Classification Search
CPC . C09K 8/68; C09K 8/665; C09K 8/80; C09K 2208/08; C09K 2208/10; E21B 43/27; E21B 43/267
See application file for complete search history.

(56) References Cited

U.S. PATENT DOCUMENTS

| 6,016,871 | A | 1/2000 | Burts, Jr. |
| 8,061,424 | B2 | 11/2011 | Willberg et al. |
| 9,932,510 | B2 | 4/2018 | Walker et al. |
| 9,938,811 | B2 | 4/2018 | Bestaoui-Spurr et al. |
| 10,301,918 | B2 | 5/2019 | Weng et al. |
| 10,526,531 | B2 | 1/2020 | Potapenko et al. |
| 10,836,952 | B2 | 11/2020 | Haq et al. |
| 10,858,569 | B2 | 12/2020 | Pernites et al. |
| 2008/0066916 | A1* | 3/2008 | Li ............... C09K 8/602 507/239 |

(Continued)

FOREIGN PATENT DOCUMENTS

| CN | 108424762 A | 8/2018 |
| WO | 2015065711 A1 | 5/2015 |

OTHER PUBLICATIONS

Guo, T. K., et al., "Evaluation and Optimization of New Nanocomposite Fiber for Fracturing Technology Based on a New Equipment" Transp Porous Med, pp. 243-257, 2012 (15 pages).

(Continued)

*Primary Examiner* — Silvana C Runyan
(74) *Attorney, Agent, or Firm* — Osha Bergman Watanabe & Burton LLP

(57) ABSTRACT

A fracturing fluid composition includes an aqueous fluid, a proppant particle, and a date tree fiber. A method of treating a hydrocarbon-bearing formation is also provided. The method includes injecting a fracturing fluid in the hydrocarbon-bearing formation, where the fracturing fluid includes an aqueous fluid, a proppant particle, and a date tree fiber.

20 Claims, 1 Drawing Sheet

(56) References Cited

U.S. PATENT DOCUMENTS

| | | |
|---|---|---|
| 2010/0263870 A1 | 10/2010 | Willberg et al. |
| 2014/0262264 A1* | 9/2014 | Potapenko ............... C09K 8/86 |
| | | 166/280.2 |
| 2016/0152889 A1* | 6/2016 | Hopkins ................ C08L 83/04 |
| | | 166/280.2 |
| 2017/0218261 A1* | 8/2017 | Nguyen ................ E21B 33/138 |
| 2017/0298263 A1* | 10/2017 | Amanullah ............ C09K 8/035 |
| 2018/0201819 A1* | 7/2018 | Amanullah ............ C09K 8/035 |
| 2019/0031545 A1 | 1/2019 | Buschmann et al. |

OTHER PUBLICATIONS

Medina, Ricardo, et al., "Settling and Mobilization of Sand-Fiber Proppants in a Deformable Fracture", Water Resources Research, pp. 9964-9977, 2018 (14 pages).

Wang, Daobing, et al., "An experimental study on the mechanism of degradable fiber-assisted diverting fracturing and its influencing factors", Journal of Natural Gas Science and Engineering, pp. 260-273, 2015 (15 pages).

"FiberFRAC Fiber-based fracturing fluid technology", Schlumberger literature, 2014 (2 pages).

Bivins, Craig H., et al., "New Fibers for Hydraulic Fracturing", Oilfield Review, pp. 34-43, 2005 (10 pages).

\* cited by examiner

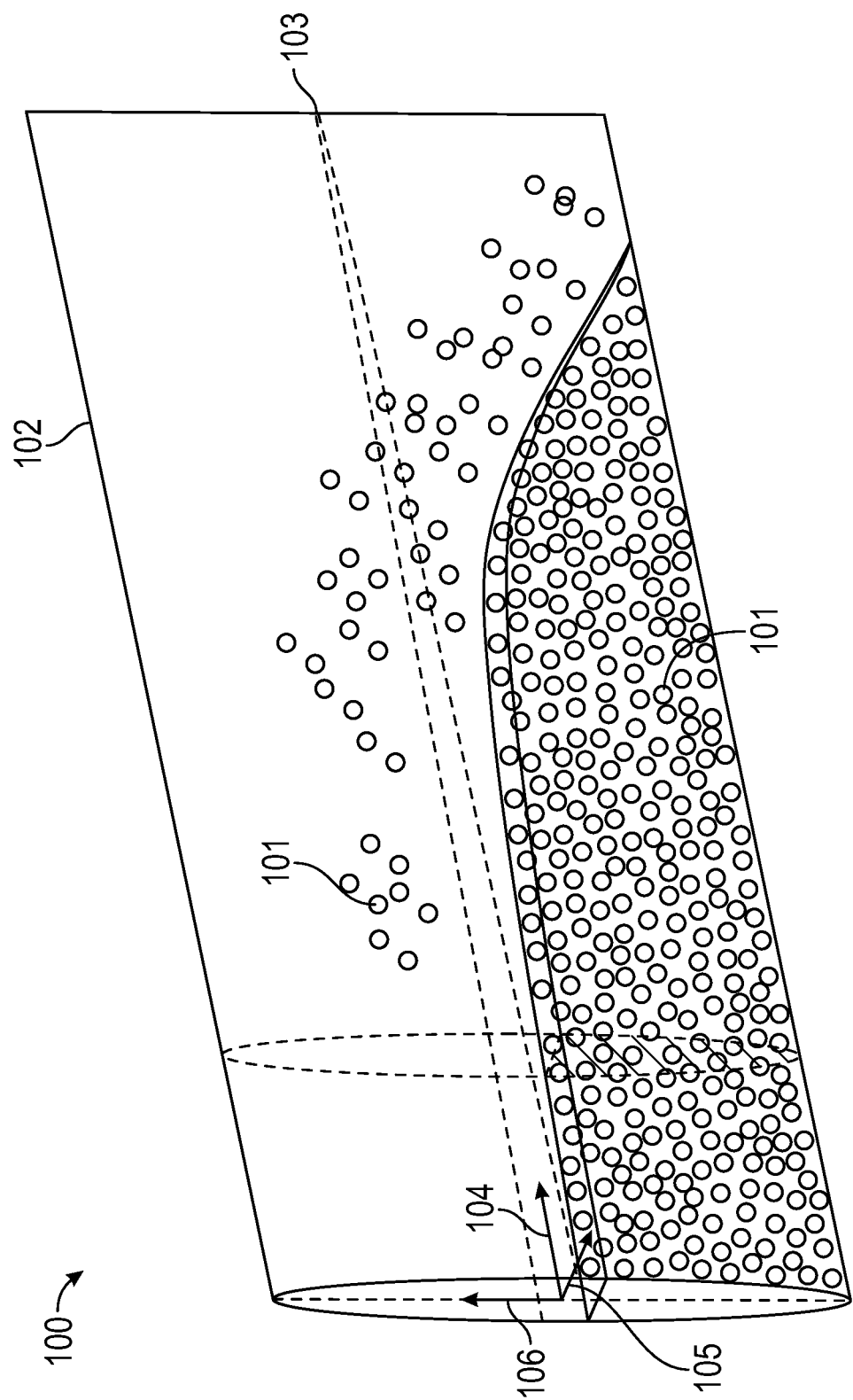

COMPOSITION AND METHOD OF USING DATE PALM FIBERS IN HYDRAULIC FRACTURING

BACKGROUND

Fracturing is a common technique in reservoir stimulation. It provides a significant increase in oil and gas production of unconventional reservoirs, and tight gas sand and shale gas formations. Fracturing of a formation may be used to create conductive fractures in reservoir formations to enhance well productivity. Fracturing may inject a fracturing fluid into an oil and gas bearing subterranean formation under high pressure, which results in the creation or growth of fractures within the formation. These fractures serve as conduits for the flow of hydrocarbons trapped within the formation to the wellbore. When injection is ceased, the induced fractures tend to close under the effect of in-situ stresses. Particles/granules conventionally referred to as proppants, may be placed in the fracture to prop the fracture open once injection is ceased. Substantial efforts focus on the design of propped fracturing of subterranean formations to achieve and retain high fracture conductivity.

Pumping of proppants during fracturing of formations may enhance the hydrocarbon production capabilities of the subterranean formation. To keep fractures open and capable of supporting the flow of hydrocarbons to the wellbore, a carrier fluid may deliver proppants to the fractures within the formation and place the proppant material in a target destination in the fracture. The proppant should be light to reach the target area of the fracture, strong to resist closure of the fracture due to formation pressure, and permeable for the flow of the fluids within the formation. When the fracture is allowed to close, it closes onto the proppant and a flow path to the wellbore between the proppant particles remains open.

One critical challenge in pumping proppants is balancing the advantageous properties of the proppants and carrier fluids during proppant transport. For example, while low viscosity carrier fluids, such as slickwater, are traditionally favored in fracturing of unconventional reservoirs, strong proppants are favored in propping open the fracture. However, the stronger a proppant's properties, the heavier the proppant, and the more likely the proppant will prematurely settle in the fracture, particularly in carrier fluids with low viscosity such as slickwater. Alternatively, lighter, smaller proppants remain suspended during transport in carrier fluids, allowing better distribution in further regions of a fracture. Unfortunately, most light material proppants possess relatively low mechanical strength and do not resist the closure pressure induced by depletion during production in the fracture or avoid damage to the proppant pack.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a fracturing fluid composition comprising an aqueous fluid, a proppant particle, and a date tree fiber.

In another aspect, embodiments disclosed herein relate to a method of treating a hydrocarbon-bearing formation. The method includes injecting a fracturing fluid in the hydrocarbon-bearing formation, where the fracturing fluid includes an aqueous fluid, a proppant particle, and a date tree fiber.

Other aspects and advantages of the claimed subject matter will be apparent from the following description and the appended claims.

BRIEF DESCRIPTION OF DRAWINGS

FIG. 1 is a schematic depiction of a wing fracture illustrating proppant particle settling velocity.

DETAILED DESCRIPTION

In one aspect, embodiments disclosed herein relate to a fracturing fluid composition that includes a proppant and a fiber. The fiber may be a date tree fiber having particularly advantageous properties for reducing proppant settling in the fracturing fluid composition.

The date tree fiber has the advantage of being a waste product that is highly abundant in many areas of oil and gas operations, and it also possesses unique physical properties making it a good candidate for use to prevent proppant settling during fracturing operations.

In general, hydraulic fracturing treatment methods are considered to have several stages. During the first stage a hydraulic fracturing fluid is injected through a wellbore into a subterranean formation at high rates and pressures. Upon reaching a threshold value, the pressure causes the formation strata/rock to crack and fracture. As the injection of fracturing fluid continues, the fractures propagate further into the formation. During a second stage, proppant may be admixed into the fracturing fluid and transported throughout the hydraulic fractures in the fracturing fluid. In this way, proppants may be deposited throughout the induced fracture, as well as natural fractures to mechanically prevent the fracture from closing after the injection, and the pressure supplied stops.

The success of a hydraulic fracturing operation may depend on how effectively the proppant is transported inside the fracture. To effectively transport a proppant, it is desirable to maintain proppant suspension in the fracturing fluid until the proppant reaches a target destination. In other words, reducing the proppant settling velocity may avoid premature settling of the proppant in the fracture. Long propped fracture length and high fracture conductivity both may depend on proppant transport inside the fracture and proppant settling behavior. The target destination of proppants is most often the area of the fracture that needs to remain propped open once the injection and pressure supplied is removed from the fracture. Thus, proppants with high mechanical strength may require additional components to reduce their settling velocity in order for them to be useful in the production stage of the hydraulic operation.

FIG. 1 shows a schematic of a wing fracture 102 illustrating proppant particle settling velocity. In FIG. 1, the wing fracture 102 is shown with fracture length 104, which extends to fracture tip 103, fracture width 105, and fracture height 106. As shown in simulated fracture system 100 in FIG. 1, proppant particles 101 may prematurely settle and accumulate on the bottom of the wing fracture 102 on their way to the fracture tip 103. The distance that a proppant may be transported by a fracturing fluid may be affected by the flow velocity of the fluid to the fracture tip, the density of the fluid, the viscosity of the fluid, and fracture aperture. In addition to the rheological properties of the carrier fluid and fracture properties, proppant settling velocity also depends on the physical properties of the proppant, such as size, shape, and density of the proppant. Placement of a proppant to a target destination may require minimizing proppant settling velocity to the fracture bottom.

Once proppants are transported and deposited to a target location in a fracture, the proppant keeps the fracture open once the pumping pressure is stopped and production stage is commenced. This in-situ pressure may be very high particularly in deep reservoirs during the production stage. The proppant needs a mechanical strength high enough to withstand the force of the fracture environment and keep the fractures open during production operations, as well as high enough to allow the flow of hydrocarbons through the fractures.

As previously described, proppants are propping agent particles used in hydraulic fracturing fluids to maintain and hold open subsurface fractures during or following subsurface treatment. In some embodiments, the proppant particle may comprise particles of materials such as oxides, silicates, sand, ceramic, resin, epoxy, plastic, mineral, glass, or combinations thereof. For instance, the proppant particle may comprise graded sand, treated sand, ceramic proppant, plastic proppant, or other materials. The proppant particle may comprise particles of bauxite, sintered bauxite, $Ti^{4+}$/polymer composites, where the superscript "4+" stands for the oxidation state of titanium, titanium nitride (TiN), or titanium carbide. The proppant particle may comprise glass particles or glass beads. Embodiments of the present disclosure may utilize at least one proppant particle and in embodiments in which more than one proppant particle is used, the proppant particles may contain a mixture of two or more different materials or three or more different materials. Examples of possible proppant particle material includes sands and ceramic materials such as KRYPTOSPHERE®, CARBO-HYDROPROP™, and CARBOLITE™ (all available from Carbo Ceramics Inc.).

The proppant particle may include various sizes or shapes. In some embodiments, the one or more proppant particles may have sizes from 8 mesh to 200 mesh (diameters from 74 micrometers (pm) to 2.36 millimeters (mm)). In some embodiments, the proppant particles may have sizes from 8 mesh to 16 mesh (diam. 2380 pm to 1 180 pm), 16 mesh to 30 mesh (diam. 600 pm to 1 180 pm), 20 mesh to 40 mesh (diam. 420 pm to 840 pm), 30 mesh to 50 mesh (diam. 300 pm to 600 pm), 40 mesh to 70 mesh (diam. 212 pm to 420 pm) or 70 mesh to 140 mesh (diam. 106 pm to 212 pm). The sphericity and roundness of the proppant particles may also vary based on the desired application.

In order to reduce the proppant settling velocity, the fracturing fluid composition of one or more embodiments may include a fiber, and in particular, a date tree fiber. Fibers may be particularly useful for their ability to interlace between proppant particles, which minimizes proppant settling. The date tree fiber formulation may include date tree trunk fibers produced from date tree trunks, date tree leaf and leaf stem fibers produced from date tree leaves and leaf stems, and date tree panicle fibers produced from date tree panicles. As will be appreciated, each date tree panicle may include date tree spikelets, which, in some embodiments, may also be used in the formation of fibers from the date tree panicles. In one or more embodiments the fiber material may include a combination of hard leaflet fibers and soft and ductile trunk fibers that may serve to form and strengthen a woven net that results in reduced proppant settling velocity.

In one or more embodiments, the fiber may be prepared by collecting deceased date palm trees, drying the date trees to a moisture content of less than 4% by mass, cleaning the date trees using high pressure air, chopping the date trees into logs around 1.5 feet in length, grinding the date trees to produce the fiber mix, sieving with 4 to 8 mm sieves and sorting the fibers to obtain fibers having a length of 4 to 12 mm. Methods may include blending the fiber mix into a fracturing fluid composition.

In one or more embodiments, the date tree fiber mix may include a mix of date tree fibers obtained from date tree waste to reduce proppant settling velocity. As used in the disclosure, the term date tree waste refers to the waste produced from farming and processing date trees (also referred to as "date palms"), such as in the production of date fruits (also referred to as "dates").

In one or more embodiments, the length of the fibers may range from 4 to 12 millimeters (mm). In one or more embodiments, the length of the fibers may have a lower limit of one of 4, 5, 6, 7, 8 and 9 mm and an upper limit of one of 9, 10, 11, and 12 mm, where any lower limit may be paired with any mathematically compatible upper limit.

In one or more embodiments, the diameter of the fibers may range from 0.20 to 0.50 mm. In one or more embodiments, the diameter of the fibers may have a lower limit of one of 0.10, 0.20, 0.25, 0.30, and 0.35 mm and an upper limit of one of 0.35, 0.40. 0.45 and 0.50 mm, where any lower limit may be combined with any mathematically compatible upper limit.

The date palm fibers disclosed herein may have a density that is lower than conventional fibers used in fracturing applications. A lower fiber density may lead to an even further reduced proppant settling velocity. The fibers in accordance with one or more embodiments may have a density of less than 0.5 grams per cubic centimeter (g/cc), or less than 0.4 g/cc, or less than 0.3 g/cc or less than 0.2 g/cc.

The date fibers may be further modified to improve their properties for use in fracturing fluids. For example, chemical agents may be added during the grinding process to produce the fibers, or during any suitable stage in the manufacturing process. In one or more embodiments, silica nanoparticles may be added to the fibers to increase their roughness but maintain their flexibility. A homogenous dispersion of silica nanoparticles on the fibers may reduce their mechanical and thermal degradation during use in the wellbore. In some embodiments, the fibers may be subjected to an alkaline treatment to increase their tensile and shear strength, which may reduce proppant production during flowback. The alkaline treatment may comprise soaking the fibers in alkaline water such as water formulated with various salts. The salts may include, but are not limited to, alkali metal oxides and hydroxides such as sodium hydroxide (NaOH), potassium hydroxide (KOH), or calcium oxide (CaO). The alkaline treatment may lead to better attachment of the proppant particles to the fiber surface, which may further reduce the proppant settling velocity.

The fracturing fluid may include the fibers in an amount that ranges from 0.1 vol.% (volume percent) to 1.0 vol.% based on the total volume of the fracturing fluid. The fibers may be included in the fracturing fluid in an amount having a lower limit of one of 0.1, 0.2, 0.3, 0.4 and 0.5 vol% and an upper limit of one of 0.6, 0.7, 0.8, 0.9 and 1.0 col% based on the total volume of the fracturing fluid.

The eco-friendly, non-toxic, and environmentally friendly properties of the date palm fiber formulation may minimize or prevent any environmental impact, any effect on ecosystems, habitats, population, crops, and plants surrounding the drilling site where the date palm fiber is used.

The fracturing fluids of one or more embodiments may include, for example, water-based fracturing fluids. The fracturing fluids may be acid stimulation fluids or EOR fluids or among others. In one or more embodiments, the water-based fracturing fluids may comprise an aqueous fluid. The aqueous fluid may include at least one of fresh water, seawater, brine, water-soluble organic compounds, and mixtures thereof. The aqueous fluid may contain fresh water formulated to contain various salts in addition to the first or second salt, to the extent that such salts do not impede the desired nitrogen-generating reaction. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In particular embodiments, brine may include an alkali metal halide or carboxylate salt and/or alkaline earth metal carboxylate salts.

The fracturing fluids may also include one or more acids. Acids may be particularly included when the fracturing fluid is to be used in a matrix stimulation process, as described below. The acid may be any suitable acid known to a person of ordinary skill in the art, and its selection may be determined by the intended application of the fluid. In some embodiments, the acid may be one or more selected from the group consisting of hydrochloric acid, sulfuric acid, carboxylic acids such as acetic acid, and hydrofluoric acid. In some embodiments, the hydrofluoric acid may be included as a hydrogen fluoride source, such as ammonium fluoride, ammonium bifluoride, fluoroboric acid, hexafluorophosphoric acid, and the like.

The fracturing fluid of one or more embodiments may comprise the one or more acids in a total amount of the range of about 0.01 to 30.0 wt.%. For example, the fracturing fluid may contain the acids in an amount ranging from a lower limit of any of 0.01, 0.05, 0.1, 0.5, 1.0, 5.0, 10, 15, 20, and 25 wt.% to an upper limit of any of 0.5, 1.0, 5.0, 10, 15, 20, 25, and 30 wt.%, where any lower limit can be used in combination with any mathematically-compatible upper limit.

The fracturing fluids of one or more embodiments may include one or more additives. The additives may be any conventionally known and one of ordinary skill in the art will, with the benefit of this disclosure, appreciate that the selection of said additives will be dependent upon the intended application of the fracturing fluid. In some embodiments, the additives may be one or more selected from clay stabilizers, scale inhibitors, corrosion inhibitors, biocides, friction reducers, thickeners, fluid loss additives, and the like.

The fracturing fluid of one or more embodiments may comprise the one or more additives in a total amount of the range of about 0.01 to 15.0 wt.%. For example, the fracturing fluid may contain the additives in an amount ranging from a lower limit of any of 0.01, 0.05, 0.1, 0.5, 1.0, 2.5, 5.0, 1.5, 10.0 and 12.5 wt.% to an upper limit of any of 0.1, 0.5, 1.0, 2.5, 5.0, 7.5, 10.0, 12.5, 15.0, 20.0 and 30.0 wt.%, where any lower limit can be used in combination with any mathematically-compatible upper limit.

A formation may be fractured by using the fracturing fluids according to one or more embodiments. The fracturing fluid may be injected into the wellbore at a pressure that may overcome the native overburden pressure of the formation, thus resulting in fracturing. The well may first be treated with a salt solution to help stabilize the formation prior to injection of the fracturing fluids.

Methods in accordance with the present disclosure may include the injection of a fracturing fluid into a formation. In one or more embodiments, the fracturing fluid may be a single treatment fluid that is injected into the wellbore in one pumping stage. In other embodiments, methods in accordance with one or more embodiments may involve the injection of the fracturing fluid and one or more additional stimulation fluids. The additional stimulation fluids may, in some embodiments, be co-injected with the fracturing fluid. In some embodiments, the stimulation fluids may be injected after the fracturing fluid.

The fracturing fluid of one or more embodiments has a low viscosity at low temperatures and, therefore, good injectivity, while being thermally stable enough for use downhole. Upon exposure to increased temperatures in the wellbore, the fracturing fluid may increase in viscosity. This phenomenon has the effect of reducing fluid mobility, resulting in diverting the flow from high permeability zones to lower ones and, ultimately, providing improved oil recovery.

The methods of one or more embodiments of the present disclosure may further comprise a pre-flushing step before the injection of the fracturing fluid. The pre-flushing step may comprise flushing the formation with a flushing solution that comprises one or more surfactants. The flushing solution may be an aqueous solution, and the surfactant may be the same surfactants as included in the fracturing fluid. The pre-flushing may limit the adsorption of the surfactants on the rock surface of the formation during the injection process. The suitability of the use of a pre-flushing step may depend on the type of surfactant and rock.

The hydrocarbon-containing formation of one or more embodiments may be a formation containing multiple zones of varying permeability. For instance, the formation may contain at least a zone having a relatively higher permeability and a zone having a relatively lower permeability. During conventional injection, fluids preferentially sweep the higher permeability zone, leaving the lower permeability zone incompletely swept. In one or more embodiments, the increased viscosity of the fracturing fluid may "plug" the higher permeability zone, allowing subsequent fluid to sweep the low permeability zone and improving sweep efficiency.

In one or more embodiments, the formation may have a temperature ranging from about 60 to 250° C. For example, the formation may have a temperature that is of an amount ranging from a lower limit of any of 60, 70, 80, 90, 100, 120, 140, 160, 180, and 200° C. to an upper limit of any of 100, 120, 140, 160, 180, 200, 225, and 250° C., where any lower limit can be used in combination with any mathematically-compatible upper limit.

The methods of one or more embodiments may be used for well stimulation. A well stimulation process in accordance with one or more embodiments of the present disclosure may include the step of injecting the fracturing fluid into a hydrocarbon-bearing formation at an injection well. In some embodiments, the injection of the fracturing fluid may be performed at a pressure that is below the fracturing pressure of the formation. A zone within the formation may be at a high temperature and increase the viscosity of the fracturing fluid. After the increase in viscosity, the tail-end of the fluid is diverted to lower-permeability zones of the formation, displacing hydrocarbons. This results from the increase in viscosity that may "plug" the more permeable zones of the formation. The formation may be stimulated by the fracturing fluid, creating pathways for hydrocarbon production. According to some embodiments, the displaced hydrocarbons may be recovered through the stimulated reservoir. In one or more embodiments, the hydrocarbons may be recovered at a production well.

The well stimulation process of one or more embodiments may be a matrix stimulation process. In the matrix stimulation process of one or more embodiments, the fracturing fluid, or one of the stimulation fluids, contains an acid. The acid fluid may react with the formation, dissolving rock, and creating wormholes that create a pathway for hydrocarbons to be displaced from deeper within the rock. In one or more embodiments, the fracturing fluid may increase in viscosity in the formation, enabling the fluid to better penetrate lower-permeability zones of the formation and allowing the acid to more uniformly react with the entire formation. This may provide for the formation of deeper wormholes and enhancing the overall permeability of the near-wellbore region. In the absence of this viscosity increase, the fluid will primarily penetrate the high permeability zones.

In one or more embodiments, the well stimulation process may be repeated one or more times to increase the amount of hydrocarbons recovered. In some embodiments, subsequent well stimulation processes may involve the use of different amounts of the surfactant and/or different surfactants than the first. The methods of one or more embodiments may advantageously provide improved sweep efficiency.

EXAMPLES

The disclosed composition may be used in any fracturing fluid. For exemplary purposes, a laboratory formulation of a slickwater fracturing fluid is shown in Table 1.

TABLE 1

| Fracturing Fluid Composition | |
| --- | --- |
| Component/Additive | Quantity |
| De-ionized water | 1000 cc |
| Surfactant | 2 cc |
| Clay control agent | 2 cc |
| Polyacrylamide-based friction reducer | 2 cc |

In Table 1, an example of a useful surfactant Therma-FRAC available from Schlumberger. An example of the clay control agent is tetramethyl ammonium chloride. Examples of the polyacrylamide friction reducer include 2-acrylamido-2-methyl-propanesulfonic acid (AMPS) and a copolymer of partially hydrolyzed PAM-AMPS-vinyl phosphonate.

The fracturing fluid was placed in a mixer and proppant (e.g. 40/20 or 40/70 mesh sand) and date palm fibers were slowly added while mixing. The process continued until the final volume fractions of proppant and fibers reach predetermined volume fractions in the base fluid (e.g. until proppant reaches 17% volume fraction, and fiber reaches 0.5% volume fraction).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C.§ 112(f) for any limitations of any of the claims herein, except for those in which the claim expressly uses the words 'means for' together with an associated function.

What is claimed:

1. A fracturing fluid composition comprising:
   an aqueous fluid;
   a proppant particle; and
   an alkaline treated date tree fiber.

2. The fracturing fluid composition of claim 1, wherein the alkaline treated date tree fiber has a density of less than 0.5 g/cc.

3. The fracturing fluid composition of claim 1, wherein the alkaline treated date tree fiber has a diameter of from 0.2 to 0.5 mm.

4. The fracturing fluid composition of claim 1, wherein the alkaline treated date tree fiber has a length of from 4 to 12 mm.

5. The fracturing fluid composition of claim 1, wherein the proppant particle comprises particles of materials selected from the group consisting of oxides, silicates, sand, ceramic, resin, epoxy, plastic, mineral, glass, and combinations thereof.

6. The fracturing fluid composition of claim 1, further comprising silica nanoparticles.

7. The fracturing fluid composition of claim 1, wherein the proppant particle has a size of from 8 mesh to 200 mesh.

8. The fracturing fluid composition of claim 1, wherein the fracturing fluid composition includes the alkaline treated date tree fiber in an amount that ranges from 0.1 vol.% to 1.0 vol.% based on a total volume of the fracturing fluid composition.

9. The fracturing fluid composition of claim 1, further comprising one or more acids in a total amount of from 0.01 to 30.0 wt.% based on a total weight of the fracturing fluid composition.

10. A method of treating a hydrocarbon-bearing formation comprising:
    injecting a fracturing fluid in the hydrocarbon-bearing formation, the fracturing fluid comprising:
    an aqueous fluid;
    a proppant particle; and
    an alkaline treated date tree fiber.

11. The method of claim 10, further comprising, prior to the injecting, flushing the formation with a flushing solution that comprises one or more surfactants.

12. The method according to claim 10, further comprising recovering hydrocarbons from the hydrocarbon-bearing formation.

13. The method of claim 10, wherein the alkaline treated date tree fiber has a density of less than 0.5 g/cc.

14. The method of claim 10, wherein the alkaline treated date tree fiber has a diameter of from 0.2 to 0.5 mm.

15. The method of claim 10, wherein the alkaline treated date tree fiber has a length of from 6 to 12 mm.

16. The method of claim 10, wherein the proppant particle comprises particles of materials selected from the group consisting of oxides, silicates, sand, ceramic, resin, epoxy, plastic, mineral, glass, and combinations thereof.

17. The method of claim 10, wherein the fracturing fluid further comprises silica nanoparticles.

18. The method of claim 10, wherein the proppant particle has a size of from 8 mesh to 200 mesh.

19. The method of claim 10, wherein the fracturing fluid includes the alkaline date treated fiber in an amount that ranges from 0.1 vol.% to 1.0 vol.% based on a total volume of the fracturing fluid.

20. The method of claim 10, wherein the fracturing fluid further comprises one or more acids in a total amount of from 0.01 to 30.0 wt.% based on a total weight of the fracturing fluid.

\* \* \* \* \*